(12) United States Patent
Udell et al.

(10) Patent No.: US 7,991,927 B2
(45) Date of Patent: Aug. 2, 2011

(54) REDUCTION OF LATENCY IN STORE AND FORWARD ARCHITECTURES UTILIZING MULTIPLE INTERNAL BUS PROTOCOLS

(75) Inventors: John Udell, Colorado Springs, CO (US); Jeffrey K. Whitt, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 321 days.

(21) Appl. No.: 12/058,984

(22) Filed: Mar. 31, 2008

(65) Prior Publication Data

US 2009/0248968 A1  Oct. 1, 2009

(51) Int. Cl.
G06F 13/38 (2006.01)
(52) U.S. Cl. .......................................... 710/52; 710/33
(58) Field of Classification Search ....................... 710/33
See application file for complete search history.

(56) References Cited

U.S. PATENT DOCUMENTS

| | | | |
|---|---|---|---|
| 5,732,094 A * | 3/1998 | Petersen et al. | 714/805 |
| 6,105,086 A * | 8/2000 | Doolittle et al. | 710/52 |
| 6,192,422 B1 * | 2/2001 | Daines et al. | 710/29 |
| 6,356,962 B1 * | 3/2002 | Kasper | 710/29 |
| 6,571,306 B1 * | 5/2003 | Smith | 710/240 |
| 6,671,258 B1 * | 12/2003 | Bonneau | 370/235 |
| 7,106,696 B1 * | 9/2006 | Lim et al. | 370/230.1 |
| 7,120,713 B2 * | 10/2006 | Kinstler | 710/117 |
| 7,231,471 B2 * | 6/2007 | Uzun et al. | 710/52 |
| 7,340,555 B2 * | 3/2008 | Ashmore et al. | 710/313 |
| 7,349,416 B2 * | 3/2008 | Jacobs et al. | 370/412 |
| 7,477,653 B2 * | 1/2009 | Smith et al. | 370/432 |
| 2007/0195761 A1 * | 8/2007 | Tatar et al. | 370/389 |
| 2008/0273545 A1 * | 11/2008 | Sgouros et al. | 370/412 |
| 2009/0003209 A1 * | 1/2009 | Kalkunte et al. | 370/232 |

* cited by examiner

*Primary Examiner* — Cheng-Yuan Tseng
(74) *Attorney, Agent, or Firm* — William W. Cochran; Cochran Freund & Young LLC

(57) ABSTRACT

Disclosed is a store and forward device that reduces latency. The store and forward device allows front end devices having various transfer protocols to be connected in a single path through a RAM, while reducing latency. Front end devices that transfer data on a piecemeal basis are required to transfer all of the data to a RAM prior to downloading data to a back end. Front end devices that transfer data in a single download begin the transfer of data out of a RAM as soon as a threshold value is reached. Hence, the latency associated with downloading all of the data into a RAM 118 and then transferring all of the data out of the RAM is eliminated.

4 Claims, 2 Drawing Sheets

REDUCTION OF LATENCY IN STORE AND FORWARD ARCHITECTURES UTILIZING MULTIPLE INTERNAL BUS PROTOCOLS

BACKGROUND OF THE INVENTION

Latency in data transfers is the delay that is created in transferring data through a system. Latency can adversely affect data processing in computer systems by delaying the transfer of data and creating problems associated with reading and writing of data. It is therefore advantageous to eliminate latency, wherever possible, to increase the speed at which computer systems operate and minimize other problems associated with latency.

SUMMARY OF THE INVENTION

An embodiment of the present invention may comprise a method of storing and forwarding data from front end devices to a back end device and reducing latency comprising: determining a transfer protocol of a first front end device that indicates that the first front end device transfers data in a piecemeal fashion; transferring substantially all data from the first front end device to a RAM prior to transferring the data from the RAM to the back end device; determining a transfer protocol from a second front end device that indicates that the second front end device transfers data in a single download; determining a threshold value based upon a transfer rate of the second front end device and a transfer rate of the RAM; transferring data from the second front end device to the RAM; detecting when the threshold level is reached in the RAM from data transferred from the second front end device to the RAM; transferring data from the RAM to the back end device when the threshold level of data is reached in the RAM.

An embodiment of the present invention may further comprise a store and forward device that reduces latency comprising: a first front end device that transfers data in a piecemeal protocol; a second front end device that transfers data in a single download protocol; an arbiter that selects one of the first front end device and the second front end device to download data; thresholding enable/size registers that generate a first read control signal upon completion of the transfer of data from the first front end device whenever the first front end device has been selected by the arbiter, and a second read control signal whenever an amount of data that is equal to a threshold value is transferred from the second front end device to the RAM; RAM read control logic that downloads data from the RAM to the back end in response to the first read control signal and the second read control signal.

DETAILED DESCRIPTION OF THE EMBODIMENTS

Figure 1:
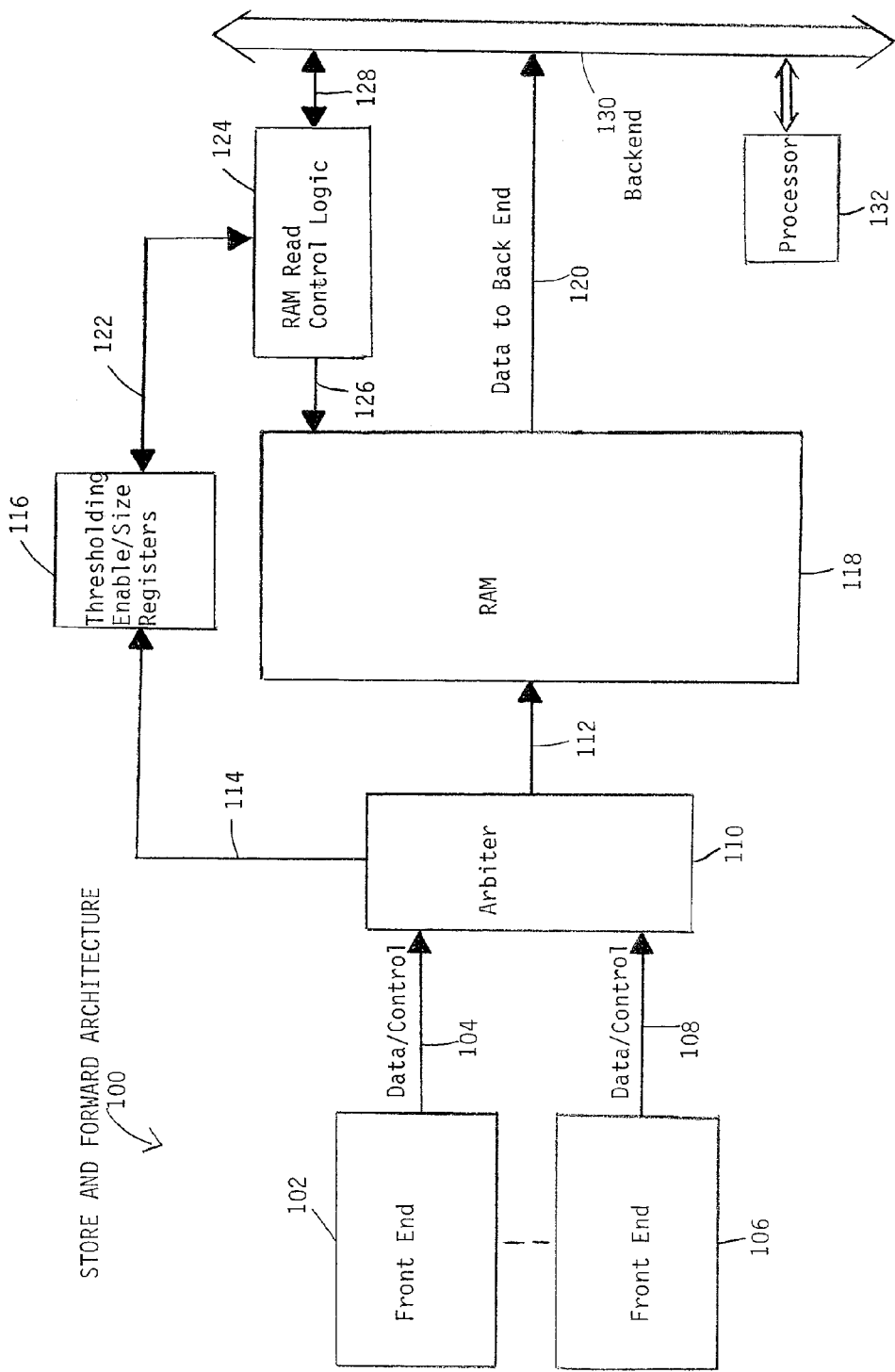
FIG. 1 is a schematic block diagram of a store and forward architecture that comprises one embodiment of the present invention.
Figure 2:
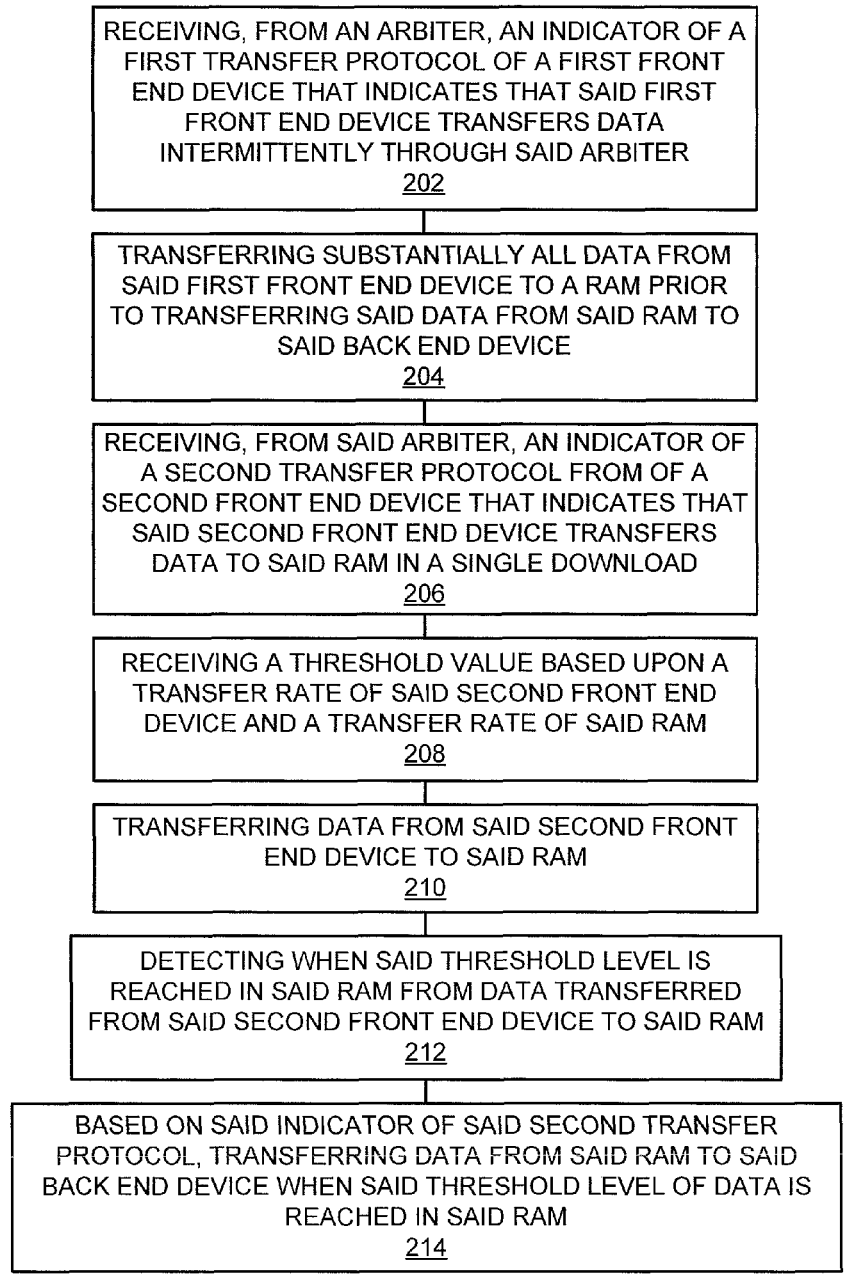
FIG. 2 is a flowchart illustrating a method of storing and forwarding data from front end devices to a back end device.

FIG. 1 is a schematic block diagram of a store and forward architecture 100. Front end 102, as well as other front end devices (not shown) that may be connected to arbiter 110, may use a particular protocol for transmitting data. For example, front end 102 may send data and control signals 104 in a piecemeal fashion, in accordance with the protocol utilized by the front end device 102. In other words, data transmissions from front end device 102 may be started and stopped in accordance with the protocol utilized by the front end device 102, rather than transferring all of the data in a single download.

Front end device 106, as well as other front end devices (not shown) that may be connected to arbiter 110, may be operate in accordance with a different protocol. For example, front end device 106 may operate in accordance with a protocol that requires that all of the data signals that are stored in the front end device 106 be transmitted at once, in a single download, from the front end device 106. The back end 130 will normally require that all of the data be transferred to the back end in a single transfer. In order to accommodate the transfer of data from front end devices that use different protocols, such as front end device 102 and front end device 106, to a back end 130, a random access memory (RAM) can be used to accumulate the data and transfer accumulated data in a single transfer. This technique of storing (accumulating) data in RAM 118 prior to transferring data to back end 130 is necessary when transferring data from a front end device, such as front end device 102, that transmits data in a piecemeal protocol, since the data must be accumulated in a RAM prior to transfer to the back end 130. However, the protocol used by front end 106 does not require that the data be accumulated in a RAM and then transferred, since the protocol of front end 106 requires that all the data from front end 106 be transferred in a single download. Hence, there is unnecessary latency in the transfer of data from the front end 106 if that data must be completely downloaded into a RAM prior to transfer to a back end 130.

The structure of FIG. 1 eliminates the latency of transfer of data from a front end device, such as front end device 106, that utilizes a protocol that requires data to be transferred in a single download. As shown in FIG. 1, front end 102 and front end 106 are connected to an arbiter 110 that arbitrates the download of data from the front end devices 102, 106, as well as other front end devices (not shown), to a RAM via connection 112. Control is granted to one of the front end devices, such as one of front end devices 102, 106, until the transfer of data to RAM 118 is complete. Access is then re-arbitrated for transfer of data from another front end device. A signal 114 is also transmitted to the thresholding enable/size registers 116 indicating the amount of data that is being transferred from the front end devices 102, 106, or other front end devices (not shown) to the RAM 118. Packets of data are intermittently transmitted from front end 102, through the arbiter and connection 112, to the RAM 118, which accumulates these packets of data until all of the data from front end 102 has been stored in the RAM 118. At that time, data is then transferred from the RAM 118 to back end 130 via connection 120. RAM read control logic 124 generates a signal 126 to cause the RAM 118 to download the data to the back end 130, when all of the data from front end 102 has been downloaded to RAM 118.

Arbiter 110, as shown in FIG. 1, may then select front end 106 to download data to RAM 118. As disclosed above, front end 106 has a protocol that requires the data that is stored in front end 106 to be transmitted in a single download. Data is then transmitted, via connector 108, to arbiter 110, which transmits the data via connector 112 to RAM 118. A signal is also transmitted via connector 114 to the thresholding enable/size registers 116 that detect the amount of data that is being transferred from the front end device 106 to the RAM 118. Control signals transmitted to the thresholding enable/size register 116, from front end device 106, identify the front end device 106 as a device having a protocol that requires all of the data to be transmitted to RAM 118 in a single download. The thresholding enable/size registers 116 then detect when the data in the RAM 118 reaches a certain threshold. When the threshold is reached, data from the RAM 118 is transferred to back end 130 via connector 120 in a single download.

The threshold value is calculated by comparing the transfer rate of the RAM 118 and the front end device 106. If the transfer rate of the RAM 118 is higher than the transfer rate of the front end device 106, which is normally the case, a certain amount of data must be transferred into the RAM 118 before the RAM starts downloading data to the back end 130. Otherwise, a complete transfer of data from the RAM 118 to the back end 130 cannot occur in a single download. Thresholding enable/size registers 116 transmit a signal via connector 122 to the RAM read control logic 124, which, in turn, generates a signal 126 to instruct the RAM 118 to begin downloading the data 118 whenever the threshold value has been reached. As indicated above, the time delay prior to the start of the download of data from the RAM 118 can be easily calculated by knowing the transfer rate of the RAM 118 and the transfer rate of the front end 106. The threshold values can be loaded into the thresholding enable/size registers 116 from processor 132 via connectors 128, 122. Processor 132 can calculate the threshold values for each front end device based upon the data transfer rates of each of the particular front end devices and the RAM 118. The threshold value can be calculated by determining the total amount of data that is to be transferred from the front end device 106. A first time period can then be calculated, which is the time required to transfer the data from the front end device 106. A second time period can then be determined, which is the time period required to transfer this same data from RAM 118 to back end 130. The difference in these time periods is then calculated, which is referred to as a difference time period. A differential data amount can then be calculated, which is equal to the amount of data that can be transferred from the second front end device during the difference time period. The threshold value should then be set at a value that is not less than the differential data amount.

By downloading data from RAM 118 prior to a complete download of data from a front end device, latency can be greatly reduced. The latency created by downloading data from front end devices that transfer data in a single download is small, since the latency is equal to the time delay that is the difference in the data transfer rates of the front end device and the RAM 118. In other words, data from a front end device, such as front end device 106, that transfers data in a single download, does not have to be completely transferred to a RAM 118 prior to the initiation of a transfer of the data from the RAM 118 to the back end device 130. Elimination of this latency allows the system to operate more quickly and efficiently.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of storing and forwarding data from front end devices to a back end device and reducing latency comprising:

receiving, from an arbiter, control signals of a first transfer protocol of a first front end device that identify that said first front end device transfers data intermittently through said arbiter;

transferring substantially all data from said first front end device to a RAM prior to transferring said data from said RAM to said back end device;

receiving, from said arbiter, control signals of a second transfer protocol of a second front end device that identify that said second front end device transfers data to said RAM in a single download;

receiving a threshold value based upon a transfer rate of said second front end device and a transfer rate of said RAM;

transferring data from said second front end device to said RAM;

detecting when said threshold level is reached in said RAM from data transferred from said second front end device to said RAM; and, based on said control signals of said second transfer protocol, transferring data from said RAM to said back end device when said threshold level of data is reached in said RAM.

2. The method of claim 1 wherein a process of determining said threshold value comprises:

determining a total amount of data that is stored in said second front end device;

determining a first time period required to transfer said total amount of data from said second front end device based upon said transfer rate of said second front end device;

determining a second time period required to transfer said total amount of data from said RAM based upon said transfer rate of said RAM;

subtracting said first time period from said second time period to obtain a difference time period;

determining a differential data amount that can be transferred from said second front end device during said difference time period; and, setting said threshold value at an amount that is not less than said differential data amount.

3. A store and forward device that reduces latency comprising:

a first front end device that transfers data using a protocol that intermittently transmits data through an arbiter;

a second front end device that transfers data through said arbiter using a single download protocol;

said arbiter selecting one of said first front end device and said second front end device to download data;

thresholding enable/size registers that generate a read control signal based on control signals identifying a transfer protocol received from said arbiter, said read control signal being generated upon completion of the transfer of data from said first front end device when said first front end device has been selected by said arbiter, and said read control signal being generated when an amount of data that is equal to a threshold value is transferred from said second front end device to said RAM and said second front end device has been selected by said arbiter; and, RAM read control logic that downloads data from said RAM to said back end in response to said read control signal.

4. The store and forward device of claim 3 further comprising:
a processor connected to said back end that generates a threshold value and transfers said threshold value to said thresholding enable/size registers.

* * * * *